2,772,285

PROCESS FOR PRODUCING COPPER-PHTHALOCYANINE PRECURSOR

Robert A. Brooks, Salem, N. J., assignor to E. I. du Pont de Nemours and Company, Wilmington, Del., a corporation of Delaware No Drawing. Application January 21, 1953, Serial No. 332,513

8 Claims. (Cl. 260—319)

This invention relates to a novel process for preparing copper-phthalocyanine precursor, sometimes referred to as leuco-copper phthalocyanine.

In copending application of Barnhart & Skiles, Serial No. 252,401, a novel, solvent-soluble complex compound is described which has no tinctorial qualities by itself, but which possesses the valuable property of yielding copper phthalocyanine upon heating or upon being treated with reducing agents. By virtue of this property, the compound, therein designated as leuco-copper phthalocyanine, may be used as a dyestuff for textile material, to be applied thereto from an alcoholic or aqueous-alcoholic bath and to be developed on the fiber by heating or reduction. The composition of this novel compound is believed to correspond to a complex made up of 6 phthalonitrile units, one atom of copper and an extra NH unit, and it was synthesized in said application by reacting phthalonitrile, ammonia and a cupric salt in an alcoholic solvent, at a temperature between 60° C. and 90° C., in the presence of a catalyst which may be urea or methyl glucamine. The term leuco-phthalocyanine, however, is of a broader nature, and includes compounds of the type described in U. S. Patents Nos. 2,662,895, 2,662,896 and 2,662,897, whereas the name phthalocyanine precursor has been adopted in the art to designate specifically compounds which have more than four phthalonitrile units per molecule, and which split off the excess phthalonitrile units upon being converted into pigment.

It is an object of this invention to provide an additional method for synthesizing leuco-copper phthalocyanine of the precursor type. Another object is to provide a method of wider applicability than the aforementioned phthalonitrile synthesis, whereby copper-phthalocyanine precursors of related but different structure may be prepared. A still further object is to provide a process having certain advantages from the viewpoint of control of quality and yield and from the viewpoint of general economy. Various additional objects and advantages of my invention will appear as the description proceeds.

Now according to my invention, copper phthalocyanine precursor is synthesized by using 1,3-diimino-isoindoline as initial material. More particularly, I heat essentially 6 moles of 1,3-diimino-isoindoline with 1 mole of a cupric salt (e. g. the chlorine, bromide or sulfate) in an inert organic solvent at a temperature between 55° C. and 95° C., and recover the reaction product by diluting the solvent after separation of any insoluble impurities or by-products.

It will be noted that in my novel process no ammonia is needed and no catalyst. The reaction is believed to proceed along the lines indicated by the following typical equation:

6C₈H₇N₃+CuCl₂→C₄₈H₂₅N₁₃Cu+3NH₃+2NH₄Cl

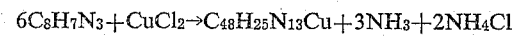

Moreover, in lieu of 1,3-diimino-isoindoline, I may employ 4,5-benzo-1,3-diimino-isoindoline, in which event I obtain the analogous but novel precursor for tetrabenz-copper phthalocyanine. The requisite 4,5-benzo-1,3-diimino-isoindoline, which may be represented by the formula

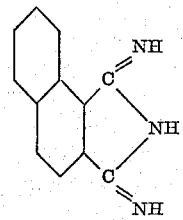

may be prepared by heating 1 part of 1,2-dicyanonaphthalene with 4 parts of liquid ammonia in a sealed vessel, at 125° C. for 4 hours.

As inert organic solvent for the aforegoing purpose may be used methanol, ethanol, the "Cellosolves" (lower monoalkyl ethers of ethylene glycol), dimethyl-formamide, nitrobenzene, o-dichlorobenzene or 1,2,4-trichlorobenzene. The alcoholic type solvents and dimethylformamide being water-miscible, they have the advantage that the reaction product may be recovered by drowning the reaction mass in water. In the case of the water-immiscible solvents, recovery may be readily effected by diluting the reaction mass with petroleum ether.

In lieu of 1,3-diimino-isoindoline itself or its 4,5-benzo analog, salts thereof may be employed, for instance the nitrate, provided a basic substance, e. g., sodium hydroxide, is added to liberate the free 1,3-diimino-isoindoline in the reaction mass.

Without limiting this invention, the following examples will serve to illustrate my preferred mode of procedure. Parts mentioned are by weight.

Example 1

A mixture of 34.8 parts (0.24 mole) of 1,3-diimino-isoindoline and 5.4 parts (0.04 mole) of anhydrous cupric chloride was added to 200 parts of dry ethylene glycol monoethyl ether. The resulting slurry was heated to 80° C. and maintained at that temperature for ninety minutes. Ammonia was freely evolved during the first sixty minutes. The reaction mixture was clarified by filtration and the filtrate was drowned in 2000 parts of cold water. The yellow-brown solid which precipitated was filtered off, washed with water and dried at room temperature.

When reduced with one part of ascorbic acid in 25 parts of boiling ethylene glycol monoethyl ether, one part of the above product yielded 0.64 part of pure copper phthalocyanine.

Example 2

Twelve and one-half parts (0.06 mole) of the nitrate of 1,3-diimino-isoindoline and 1.4 parts (0.01 mole) of anhydrous cupric chloride were added to 100 parts of ethylene glycol monoethyl ether. The mixture was heated to 90° C., and 2.4 parts (0.06 mole) of sodium hydroxide dissolved in 50 parts of ethylene glycol monoethyl ether at 90° C. were added. The temperature of the reaction mass was held between 85° C. and 90° C. for 45 minutes. Ammonia was freely evolved during the first 40 minutes. The mixture was clarified and drowned in 1500 parts of cold water. The yellow-brown product which precipitated was filtered off, washed with water and dried at room temperature.

Reduction of this product with ascorbic acid in boiling ethylene glycol monoethyl ether gave pure copper phthalocyanine.

Example 3

A mixture of 21 parts of 4,5-benzo-1,3-diimino-isoindoline, 2.5 parts of dry cupric chloride, and 400 parts of ethylene glycol monoethyl ether was heated at 80° C. for 30 minutes. Ammonia was evolved freely. The reaction mass was filtered, and the filtrate was drowned in 10 volumes of water. The light brown solid which separated was collected by filtration and dried. The product obtained may be designated as tetrabenzo copper phthalocyanine precursor, and may be represented by the formula $(C_{12}H_6N_2)_6 \cdot Cu \cdot NH$.

Reduction of this product with ascorbic acid in boiling ethylene glycol monoethyl ether gave copper tetrabenzo phthalocyanine, a bright green pigment.

*Example 4*

A mixture of 14.5 parts of 1,3-diimino-isoindoline and 2.1 parts of cupric chloride was added to 100 parts of nitrobenzene. The mixture was heated to 80° C. and stirred at that temperature for thirty minutes. Ammonia was freely evolved. The reaction mixture was filtered at 80° C., and the filtrate was poured into 1000 parts of petroleum ether. A heavy, yellow-brown product separated, and was isolated by filtration. Reduction of a portion of this product with ascorbic acid in boiling ethylene glycol monoethyl ether gave copper phthalocyanine.

*Example 5*

A mixture of 20.8 parts of 1,3-diimino-isoindoline nitrate and 2.1 parts of cupric chloride was added to 100 parts of nitrobenzene. The mixture was heated to 80° C. and 4 grams of sodium hydroxide were added carefully. Ammonia was evolved at once. The reaction mixture was stirred at 80° C. for one hour, and then filtered at 80° C. The filtrate was drowned in 1000 parts of petroleum ether to give a yellow-brown, insoluble product. This product was filtered off and dried at room temperature. Reduction of a portion of it with ascorbic acid in boiling ethylene glycol monoethyl ether gave copper phthalocyanine.

In lieu of ethylene glycol monoethyl ether in Examples 1, 2 and 3, the corresponding monomethyl or monobutyl ether may be used. Also, dimethyl formamide may be used either by itself or in admixture with any of the aforementioned alcoholic solvents. Likewise, in lieu of nitrobenzene in Examples 4 and 5, o-dichlorobenzene or 1,2,4-trichlorobenzene may be used.

In lieu of cupric chloride in the above examples, other salts of copper, for instance cupric sulfate or cupric acetate may be used. The examples specified the anhydrous salts; but this is not an absolute requirement, inasmuch as the reaction proceeds also with the various hydrated forms of the mentioned salts, for instance blue vitriol $(CuSO_4 \cdot 5H_2O)$.

Likewise, in lieu of the alcoholic solution of sodium hydroxide in Example 2, concentrated aqueous sodium hydroxide, for instance a 30% solution, may be employed. The criterion is not to add so much water as to encourage decomposition of the precursor compound in the reaction mass; this is a test which can be observed visually in the course of operation, inasmuch as the mentioned decomposition results in the production of the insoluble copper phthalocyanine with its characteristic blue shade.

The reaction temperature may be maintained anywhere between 55° C. and 95° C. Prolonged heating near the higher temperature limit is however to be avoided, inasmuch as it tends to decrease the yield of desired leuco compound through by-production of copper phthalocyanine. The reaction is essentially complete when ammonia is no longer evolved.

While the employment of stoichiometric proportions (6 moles of the diimino compound to 1 mole of copper salt) is recommended for maximum economy and purity, considerable deviation from these proportions is permissible, say up to 20% excess of either reactant, inasmuch as the excess will be automatically removed in the recovery step.

Numerous other variations in detail will be readily apparent to those skilled in the art.

The requisite initial material, 1,3-diimino-isoindoline, may be prepared by any convenient method known to the art, for instance by heating phthalonitrile and liquid ammonia in a sealed vessel at temperatures between 120° C. and 350° C.

Furthermore, in lieu of pure 1,3-diimino-isoindoline a crude reaction mass containing the same may be used, for instance the reaction product obtained by heating phthalonitrile and urea in a "Cellosolve" at a temperature of 120° C. to 145° C.

If desired, the synthesis of the diimino-isoindoline may be combined into a continuous process with its further transformation into leuco-copper phthalocyanine according to this invention. For instance, phthalonitrile may be heated with 3 to 25 moles of liquid ammonia in a sealed vessel at a temperature between 120° C. and 350° C. for 3 to 6 hours, whereupon the mass may be cooled, and after venting off the excess of ammonia, an alcoholic solvent plus essentially the theoretical proportion of a cupric salt may be added. The mass may then be heated at 60° C. to 90° C. until free ammonia no longer is liberated, and the reaction product may be recovered as indicated hereinabove.

I claim as my invention:

1. A process for producing a copper phthalocyanine precursor, which comprises reacting a compound of the group consisting of 1,3-diimino-isoindoline and its 4,5-benzo analog with a cupric salt in an inert organic solvent, at a temperature between 55° C. and 95° C. and in the absence of added ammonia, the quantities of said reactants being essentially in the proportion of 6 moles of the diimino-isoindoline compound to 1 mole of cupric salt, and recovering the reaction product by dilution of the solvent.

2. A process as in claim 1, the solvent being nitrobenzene.

3. A process as in claim 1, the diimino-isoindoline compound being generated in situ from a salt thereof by the aid of a base soluble in the solvent selected.

4. A process as in claim 1, the solvent being a water-miscible organic solvent of the group consisting of methanol, ethanol, the lower alkyl monoethers of ethylene glycol, and dimethyl formamide.

5. A process as in claim 4, the reaction product being precipitated by drowning the reaction mass in water.

6. A process as in claim 4, recovery of the reaction product being effected by removing from the reaction mass insoluble impurities, and drowning the resulting clear solution in water.

7. A process as in claim 2, the precursor being precipitated by diluting the reaction mass with petroleum ether.

8. The precursor compound obtained by reacting 4,5-benzol-1,3-diimino-isoindoline with a cupric salt in an inert organic solvent according to the process defined in claim 1, said precursor being a light-brown solid, soluble in ethylene glycol monoethyl ether, and yielding upon reduction with ascorbic acid a bright green pigment.

References Cited in the file of this patent

UNITED STATES PATENTS

| | | |
|---|---|---|
| 2,160,837 | Detrick | June 6, 1939 |
| 2,245,098 | Turek | June 10, 1941 |
| 2,302,612 | Lacey | Nov. 17, 1942 |
| 2,318,787 | Lacey | May 11, 1943 |
| 2,683,643 | Baumann et al. | July 13, 1954 |

FOREIGN PATENTS

| | | |
|---|---|---|
| 698,049 | Great Britain | Oct. 7, 1953 |
| 879,100 | Germany | July 9, 1953 |

OTHER REFERENCES

Haddock: J. of Soc. Dyers and Colourists, vol. 61, p. 71 (1945).